US011056021B2

United States Patent
Takayama (10) Patent No.: US 11,056,021 B2
(45) Date of Patent: Jul. 6, 2021

(54) METHOD FOR PRODUCING SIMULATED ANIMAL ORGAN AND SIMULATED ANIMAL ORGAN

(71) Applicant: KOTOBUKI GIKEN INC., Yashio (JP)

(72) Inventor: Seiichiro Takayama, Saitama (JP)

(73) Assignee: KOTOBUKI MEDICAL INC., Yashio (JP)

( * ) Notice: Subject to any disclaimer, the term of this patent is extended or adjusted under 35 U.S.C. 154(b) by 201 days.

(21) Appl. No.: 15/108,709

(22) PCT Filed: Jun. 6, 2016

(86) PCT No.: PCT/JP2016/066731
§ 371 (c)(1),
(2) Date: Jun. 28, 2016

(87) PCT Pub. No.: WO2017/010190
PCT Pub. Date: Jan. 19, 2017

(65) Prior Publication Data
US 2017/0148355 A1    May 25, 2017

(30) Foreign Application Priority Data

Jul. 10, 2015 (JP) .............................. JP2015-138381

(51) Int. Cl.
*G09B 23/30* (2006.01)
*B29C 39/14* (2006.01)
(Continued)

(52) U.S. Cl.
CPC .............. *G09B 23/30* (2013.01); *B29C 39/10* (2013.01); *B29C 39/142* (2013.01); *B29C 39/38* (2013.01);
(Continued)

(58) Field of Classification Search
CPC ...................................................... G09B 23/30
(Continued)

(56) References Cited

U.S. PATENT DOCUMENTS 5,141,973 A * 8/1992 Kobayashi ................. C08J 3/03
523/300
2005/0142202 A1* 6/2005 Roorda ................ A61K 9/1617
424/489
(Continued)

FOREIGN PATENT DOCUMENTS

EP      2 011 450 A1    1/2009
JP         2-26567 A    1/1990
(Continued)

OTHER PUBLICATIONS

Yoshiki et al, Japanese Patent Application Publication JP 06-165648, published Jun. 14, 1994, Applicant Provided IDS reference filed Aug. 20, 2020 (Year: 1994).*
(Continued)

*Primary Examiner* — Thomas J Hong
(74) *Attorney, Agent, or Firm* — Flynn Thiel, P.C.

(57) ABSTRACT

A method for producing a simulated animal organ includes: a shaping step of mixing a raw material containing mannan as a main component and water for gelatinization and shaping a gelatinized substance into a shape of an animal organ to obtain a shaped body; and a low temperature step of keeping the shaped body in a low temperature environment lower than a normal temperature. As a result, a simulated animal organ in a state extremely close to an actual animal organ is provided.

14 Claims, 5 Drawing Sheets

(51) Int. Cl.
  *B29C 39/10* (2006.01)
  *B29C 39/38* (2006.01)
  *G09B 9/00* (2006.01)
  *B29L 31/00* (2006.01)

(52) U.S. Cl.
  CPC ............ *G09B 9/00* (2013.01); *B29K 2005/00* (2013.01); *B29L 2031/7532* (2013.01)

(58) Field of Classification Search
  USPC ........................................................ 434/272
  See application file for complete search history.

(56) References Cited

U.S. PATENT DOCUMENTS

| | | | |
|---|---|---|---|
| 2008/0076099 | A1 | 3/2008 | Sarvazyan et al. |
| 2014/0162016 | A1* | 6/2014 | Matsui .................... B29C 69/00 428/76 |
| 2014/0248596 | A1* | 9/2014 | Hart ....................... G09B 23/30 434/272 |

FOREIGN PATENT DOCUMENTS

| | | |
|---|---|---|
| JP | 04-011853 A | 1/1992 |
| JP | 6165648 A | 6/1994 |
| JP | 10-57336 A | 3/1998 |
| JP | 2002-360572 A | 12/2002 |
| JP | 2007-185136 A | 7/2007 |
| JP | 4126374 B2 | 7/2008 |
| JP | 2009-216690 A | 9/2009 |
| JP | 2013-15789 A | 1/2013 |
| JP | 5214733 B2 | 3/2013 |
| JP | 2015-36809 A | 2/2015 |
| WO | WO 2010/016353 A1 | 2/2010 |

OTHER PUBLICATIONS

Notification of Transmittal of International Search Report issued in Application No. PCT/JP2016/066731 dated Aug. 30, 2016 (2 pages).
International Search Report issued in Application No. PCT/JP2016/066731 dated Aug. 30, 2016 (3 pages).
Written Opinion of International Searching Authority issued in Application No. PCT/JP2016/066731 dated Aug. 30, 2016 (5 pages).
European Search Report for corresponding application No. 16824170.1, dated Jun. 18, 2018 (5 pgs).
"A Molecular Description of the Gelation Mechanism of Konjac Mannan", by M. Williams et al., Biomacromolecules, 2000, vol. 1, pp. 440-450.
Japanese Office Action issued in corresponding Japanese Application No. 2016-538138, dated Jun. 2, 2020 (6 pages).

* cited by examiner

METHOD FOR PRODUCING SIMULATED ANIMAL ORGAN AND SIMULATED ANIMAL ORGAN

TECHNICAL FIELD

The present invention relates to a simulated animal organ usable for the purpose of surgery training on an animal including a human, and other purposes.

BACKGROUND ART

Surgical operations are widely performed on animals including humans. For example, surgery for excision of a tumor or the like from an organ, surgery for partial resection of an organ, surgery for implanting an organ and surgery for suturing an organ are known.

Such surgeries require a surgeon to have a considerable technique in an incising operation with a knife (including an electric knife) and a stitching operation for suture or anastomosis and the like, and therefore, such a technique is usually trained for before actually performing surgery.

Therefore, biological models (simulated animal organs) have conventionally been used for practical training in medical education, surgery technique training and the like. Such a simulated animal organ is generally made of a silicone resin or polyurethane, and in addition, a biological model made of a polymer resin has been also proposed (see Japanese Patent No. 4126374).

SUMMARY OF INVENTION

Technical Problem

If a silicone resin or the like is used for a simulated animal organ, however, there arises a problem in which the price of the material is too high to be suitably used for training. It is assumed that a simulated animal organ made of a silicone resin or the like is repeatedly used for training, however, there are also problems in which repeated use is not hygienic and it is difficult to reuse a simulated animal organ having been incised with a knife.

Similarly, if a simulated animal organ is made of polyvinyl alcohol (PVA) or the like, the simulated animal organ is cut with an electric knife as if it was molten, which deviates from the actual touch of a living body, and hence there arises a problem in which such a simulated animal organ is not suitable for training.

Besides, in medical facilities, a large number of simulated animal organs having been used for training are discarded, and if the simulated animal organs are made of chemical constituent materials such as a silicone resin and a polymer resin, there arises a problem in which the environment is liable to be harmfully affected in the disposal of these materials.

Furthermore, for such simulated animal organs, it is preferable that flexibility, elasticity and the like felt in incising them with a knife or the like are the same as or similar to those felt in incising actual organs or tissues of living bodies. In the conventional simulated animal organs, however, the feeling obtained in incision is different from that obtained using an actual living body, and in particular, there is a problem in which an inside state of an incised organ cannot be reproduced.

The present invention was accomplished in consideration of the above-described problems, and has an object to provide a simulated animal organ applicable to practical training in education or surgery training in a state similar to that of an actual animal organ.

Solution to Problem

The present invention for achieving the above-described object is a method for producing a simulated animal organ including: a shaping step of mixing a raw material containing mannan as a main component and water for gelatinization and shaping a gelatinized substance to obtain a shaped body; and a low temperature step of keeping the shaped body in a low temperature environment lower than a normal temperature.

In the production method, the shaped body is kept at 0° C. or lower in the low temperature step.

In the production method, the shaped body is frozen in the low temperature step.

In the production method, an electrolyte is mixed with the water in the shaping step.

In the production method, the electrolyte is mixed at 1.0% by weight or less.

In the production method, the electrolyte is sodium chloride.

In the production method, a thickener is mixed in the shaping step.

The production method further includes a drying step of drying the shaped body.

In the production method, the drying step is performed after the low temperature step.

In the production method, the low temperature step is performed after the drying step.

The production method further includes a heating step of heating the shaped body.

In the production method, the heating step is performed after the low temperature step.

In the production method, a foreign matter is contained inside the shaped body in the shaping step.

The production method includes a second shaping step of filling or stacking, inside or around the shaped body, a second material obtained by gelatinizing a mixture of a raw material containing mannan as a main component and water.

The present invention for achieving the above-described object is a simulated animal organ produced by any of the above-described production methods.

The present invention for achieving the above-described object is a simulated animal organ obtained by shaping a gelatinized material containing mannan as a main component; an electrolyte; and water.

In the simulated animal organ, the electrolyte is contained in the gelatinized material at 1.0% by weight or less.

In the simulated animal organ, the electrolyte is sodium chloride.

In the simulated animal organ, the gelatinized material contains a thickener.

In the simulated animal organ, the thickener is contained in the gelatinized material at 5.0% by weight or less.

The present invention for achieving the above-described object is a simulated animal organ obtained by shaping a gelatinized material containing mannan as a main component; a thickener; and water.

Advantageous Effect of Invention

The present invention attains an excellent effect that a simulated animal organ in a state extremely close to that of an actual animal organ can be obtained.

DESCRIPTION OF EMBODIMENTS

A first embodiment of the present invention will now be described with reference to the accompanying drawings.

Figure 1:
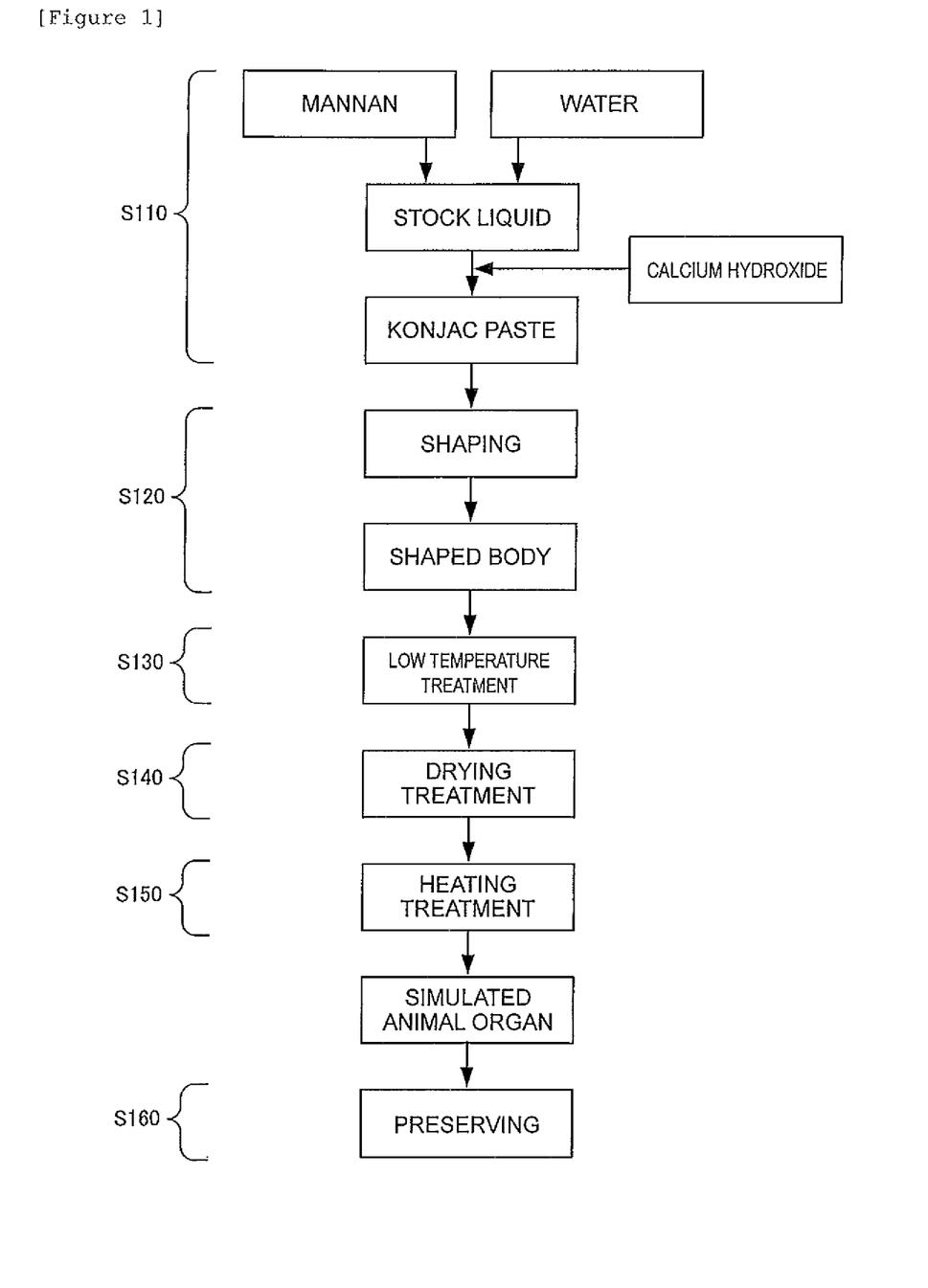
FIG. 1 is a flowchart illustrating a production process for a simulated animal organ according to a first embodiment of the present invention.

FIG. 1 illustrates a production process for a simulated animal organ according to the first embodiment of the present invention.

<Kneading/Gelatinizing Step (S110)>

In a kneading/gelatinizing step S110, a raw material containing mannan as a main component is mixed with water and the resultant mixture is kneaded to obtain a stock liquid. Mannan is a polysaccharide containing mannose as a main constitutional unit, and for example, glucomannan, galactomannan, a konjac flour (a kind of glucomannan) or the like can be used. The glucomannan is obtained by polymerizing glucose and mannose in a ratio of about 2:3 to 1:2. The galactomannan is obtained by polymerizing mannose and galactose.

A mixing ratio between the raw material and water is, for example, 3:97, and the raw material is gradually added to water under stirring to prepare the stock liquid, and the resultant mixture is allowed to stand fora while. It is noted that a coloring material may be preferably mixed with the stock liquid. For example, the stock liquid may be colored in a color close to that of an animal organ (pink or reddish brown in application to a viscera).

Thereafter, calcium hydroxide or the like is added to the stock liquid, and the resultant composition is further stirred for gelatinization. As a result, a so-called konjac paste can be obtained.

<Shaping Step (S120)>

In a shaping step S120, the konjac paste is shaped into the same shape as an animal organ of interest. If the animal organ is, for example, a viscera, the konjac paste is poured into a mold in the shape of the viscera to three-dimensionally shape the paste. If the animal organ is a skin, the konjac paste is poured into a plate-shaped mold to shape the paste into a sheet. If it is a blood vessel, the konjac paste may be continuously extruded through a circular hole or a ring-shaped hole to shape the paste into a string or tube. It goes without saying that the paste may be shaped not by extrusion but by using a mold into a blood vessel, an intestinal tract, an esophagus, a lung, a tongue or the like. As a result, a shaped body made of the konjac paste shaped into a desired shape can be obtained.

<Low Temperature Step (130)>

In a low temperature step S130, the shaped body is kept in a low temperature environment lower than a normal temperature for a prescribed period of time. Thus, the tensile strength and the tear strength inside the shaped body can be increased. For example, in a case where a surgical technique for an organ is being trained for, the organ is incised with an electric knife, and forceps are inserted into the incised portion to pinch the inside tissue of the organ in some cases. This is because it is necessary to incise a deeper portion with the inside tissue of the organ pinched with the forceps, or to perform peeling or excision surgery with the inside tissue of the organ pulled with the forceps. Therefore, the tensile strength and the tear strength inside the shaped body are increased through low temperature step, so as to provide an environment where such a surgical technique is trained for.

In the low temperature step S130, the shaped body is specifically kept at 0° C. or lower to freeze at least a part thereof. When the shaped body is frozen, the binding state in the konjac paste is enhanced, so that a situation where it is crushed or torn off when pinched with forceps can be appropriately reduced, and thus, an inside state extremely close to that of an actual organ can be attained. In order to efficiently freeze the shaped body, it is kept in an environment of preferably −15° C. or lower, and more preferably −20° C. or lower. For example, the shaped body can be kept at about −27° C. for 30 minutes to several hours.

Besides, in this low temperature step S130, it is preferred that a center portion of the shaped body is kept in an unfrozen state with an outer surface portion thereof frozen. Thus, a simulated animal organ in which the tensile strength is stronger on a surface side and gradually becomes weaker toward a center portion can be obtained. Furthermore, owing to a difference in characteristic value between the frozen portion and the unfrozen portion, a boundary can be formed and a peeling technique can be trained along the boundary. An actual organ also includes a large number of such structures, and hence, such a simulated animal organ is an extremely preferable aspect for the training.

<Drying Step (S140)>

In a drying step S140, a water component of the shaped body is evaporated. In this drying step S140, merely a portion in the vicinity of the outer surface of the shaped body may be dried, and thus, the tensile strength of the outer surface alone can be increased. In some kinds of organs, it is sometimes more practical that there is an epidermis (or an outer bag), and an epidermis can be simulatively formed through this drying step S140. Incidentally, if there is no need to form an epidermis, this drying step S140 can be omitted.

On the other hand, if the shaped body is dried too much in the drying step S140, the resultant shaped body becomes a so-called jerked state, and it is apprehended that the tensile strength becomes so high that reproducibility for an actual living body may become poor. Besides, it is difficult to completely dry also the inside of the shaped body. If the shaped body is to be dried deep inside, the surface thereof is dried too much. Accordingly, for reproduction of an organ, the low temperature step S130 for causing appropriate strength is preceded, and it is preferable to combine the drying step S140 with that step to suitably control the tensile strength of the inside and the tensile strength of the outer surface of the shaped body. At this point, the drying step S140 is preferably performed after the low temperature step S130, but the drying step S140 may be performed before the low temperature step S130 in some cases in accordance with the purpose of an organ to be reproduced.

Incidentally, it is possible to simultaneously perform the low temperature step S130 and the drying step S140 by so-called vacuum-freeze drying.

For example, if the low temperature step S130 is performed before the drying step S140, both the outer surface and the inside are changed into a rather mesh-like form (a fibrous form), and hence the tensile strength can be increased as a whole. Although the hardness of the outer surface is increased through the following drying step S140, the mesh-like form constitution is not particularly changed.

On the other hand, if the drying step S140 is performed before the low temperature step S130, the outer surface becomes smooth (is placed in a dense state), and hence, the strength of the outer surface can be locally increased. Merely the inside becomes a rather mesh-like form through the following low temperature step S130, and the tensile strength of the inside can be thus increased. Accordingly, an organ produced by, for example, performing the drying step S140 before the low temperature step S130 is advantageous in that even if training to inject a liquid through an outer surface into the inside thereof with a needle is performed, the liquid is difficult to leak through the outer surface.

<Heating Step (S150)>

In a heating step S150, the shaped body is heated to increase the elasticity. Specifically, the step may be performed by putting the shaped body in boiling water and heating it for several ten minutes. Incidentally, some kinds of organs do not require elasticity, and in such a case, the heating time may be reduced, the heating temperature may be lowered to a temperature range beyond normal temperature, or the heating step S150 may be omitted. This heating step S150, however, can be performed also as a sterilizing step, and hence is preferably performed as needed. It goes without saying that sterilization can be performed by a method different from the heat sterilization.

This heating step S150 is preferably performed after the low temperature step S130 and the drying step S140. If the elasticity is provided by performing the heating step S150 in advance, it is difficult to attain the desired tensile strength even if the low temperature step S130 or the drying step S140 is performed thereafter. Through the above-described steps, a simulated animal organ 10 is completed.

<Preserving Step (S160)>

In a preserving step S160, the simulated animal organ 10 completed through the above-described plural steps is immersed in a strong alkaline liquid and packaged. In this manner, it can be stored at normal temperatures or chilled stored for several months to several years.

Figure 2:
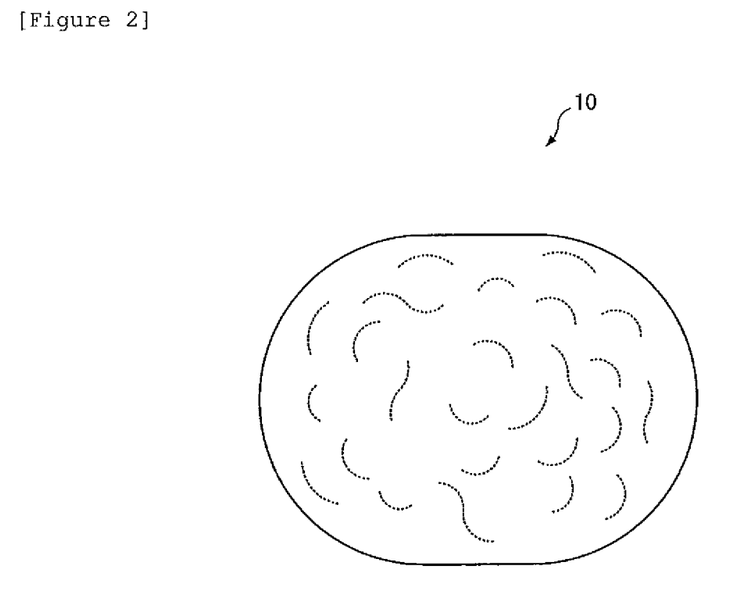
FIG. 2 is a plan view of the simulated animal organ.

FIG. 2 illustrates the simulated animal organ 10 produced through the above-described steps. This simulated animal organ 10 is highly reproducible for an actual organ such as a viscera. Specifically, it has the following advantages:

(1) Conductivity

Figure 3:
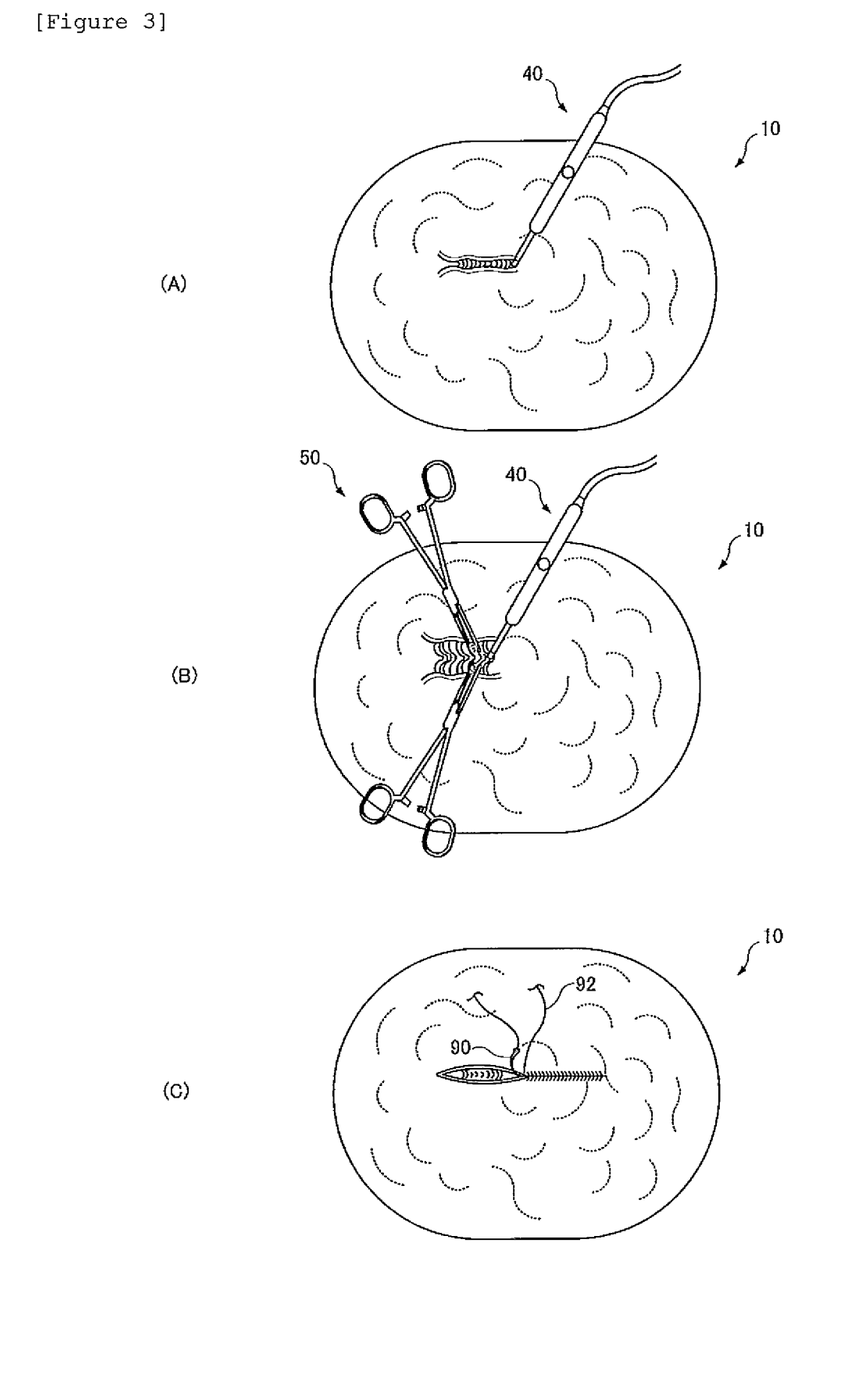
FIG. 3(A) is a plan view of a state where the simulated animal organ is incised with an electric knife.
FIG. 3(B) is a plan view of a state where inside tissue is pinched with forceps in the simulated animal organ.
FIG. 3(C) is a plan view of a state where an incised portion is sutured in the simulated animal organ.

The present simulated animal organ 10 has a conductivity. Therefore, it is possible to perform training for a surgical technique using an electric knife 40 as illustrated in FIG. 3(A), and feeling obtained in incising the simulated animal organ 10 with the electric knife is extremely close to that obtained in incising an actual organ.

(2) Storage Property

The present simulated animal organ 10 can be stored for a long period of time. If the package is not opened, it can be stored at normal temperature for 1 or more years, and even if the package is opened, it can be stored for several days.

(3) Disposability

The present simulated animal organ 10 contains a natural plant-derived component (food) as a main component, it can be simply discarded similarly to garbage. Besides, an environment-polluting substance is not generated in its disposal (for example, incineration or landfill) performed after the discard.

(4) Inexpensiveness and Hygienic Property

The present simulated animal organ 10 can be mass-produced extremely inexpensively. As a result, simulated animal organs can be frequently exchanged (discarded), resulting in enabling surgical technique training to be performed always under a hygienic environment.

(5) Usage of Forceps

The present simulated animal organ 10 has appropriate tensile strength also inside thereof. Accordingly, as illustrated in FIG. 3(B), it is possible to perform training of a surgical technique to pinch, hold and pull inside tissue of an incised organ with forceps 50. Incidentally, if the low temperature step S130 is omitted in the production, the inside tissue is so soft that the material can be torn off when pinched with the forceps.

(6) Suturing Characteristic

As illustrated in FIG. 3(C), in the present simulated animal organ 10, an incised portion can be sutured using a surgical needle 90 and surgical thread 92. For performing suture training, it is preferred that the tensile strength of the surface is increased through the low temperature step S130 or the drying step S140.

(7) Ultrasonography

In the present simulated animal organ 10, an output state close to that of an actual organ can be attained also in echography (ultrasonography). Accordingly, it can be used for training of echography, and besides, a series of training of a combination of echography and surgical operation can be performed using a single simulated animal organ 10. The simulated animal organ is similarly applicable to various diagnostic imaging apparatuses (including X-ray, CT, MRI and the like).

Figure 4:
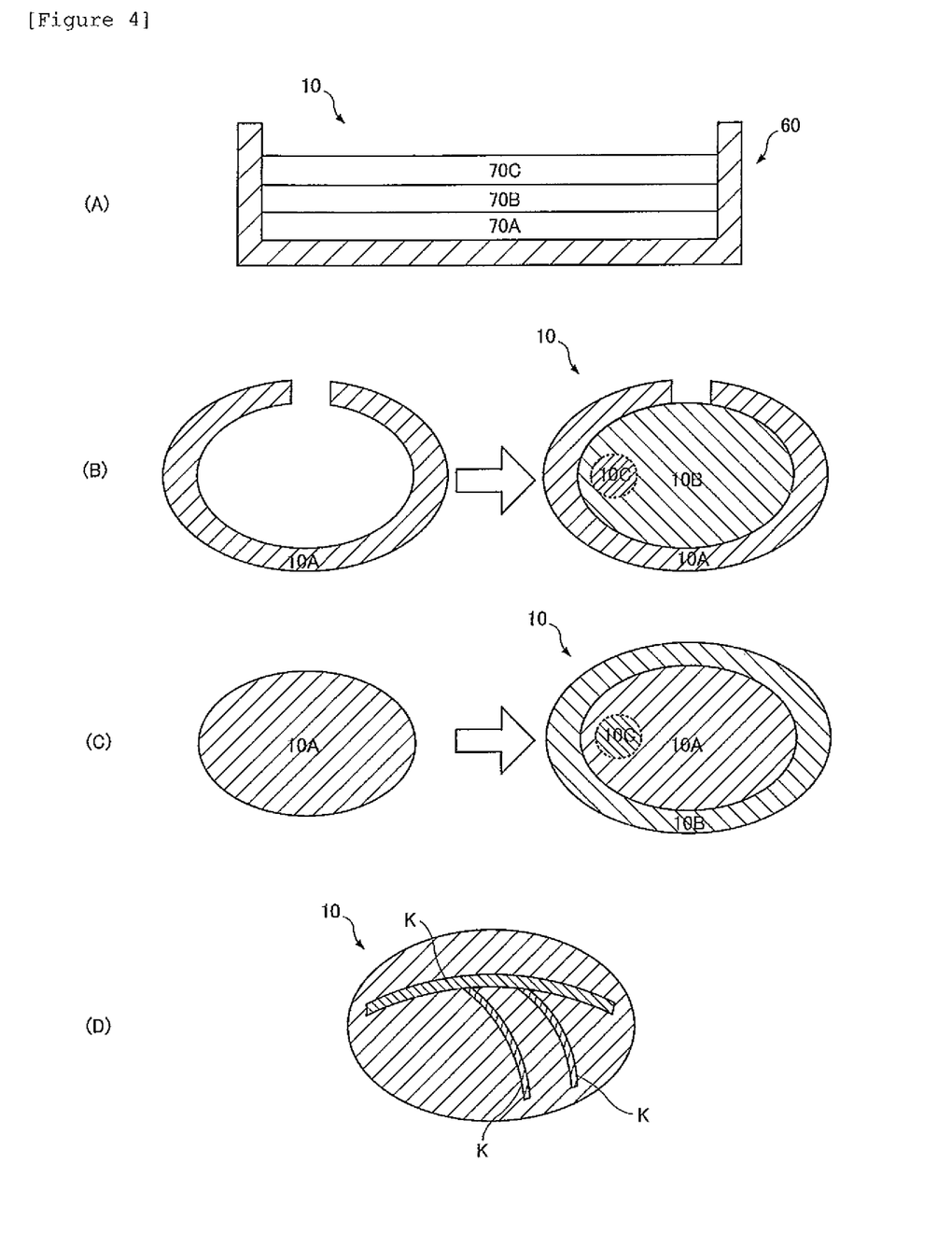
FIG. 4(A) is a cross-sectional view of the simulated animal organ in a multilayer form.
FIGS. 4(B) to 4(D) are cross-sectional views illustrating other constitutional examples of the simulated animal organ.

In the above-described first embodiment, a case where the production is performed by using a single stock liquid or through single shaping step S120 is described as an example, to which the present invention is not limited. For example, a plurality of stock liquids may be prepared to be separately poured into a mold to form a multilayer structure. As illustrated in FIG. 4(A), when a plurality of stock liquids 70A, 70B and 70C are stacked in a mold 60 in a plate shape, and different characteristics are provided through the low temperature step S130, the drying step S140 and the heating step S150 performed thereafter, a multilayer simulated animal organ 10 can be obtained. Alternatively, it is also preferable to appropriately selectively perform the low temperature step S130, the drying step S140 and the heating step S150 after stacking the first stock liquid 70A, to appropriately selectively perform the low temperature step S130, the drying step S140 and the heating step S150 after stacking the second stock liquid 70B, and to appropriately selectively perform the low temperature step S130, the drying step S140 and the heating step S150 after stacking the third stock liquid 70C. When the production is performed through a plurality of steps in this manner, even if the first through third stock liquids 70A to 70C have the same composition, different characteristics can be provided to respective layers because there is a time difference in the low temperature step S130, the drying step S140 and the heating step S150 performed thereafter.

Alternatively, as illustrated in FIG. 4(B), after forming a first simulated animal organ 10A in a bag shape using a mold, a second simulated animal organ 10B may be formed inside by pouring a raw material into the first simulated animal organ, so as to produce an integrated simulated animal organ 10 as a whole. On the other hand, as illustrated in FIG. 4(C), after forming a first simulated animal organ 10A in a bulk shape using a mold, a second simulated animal organ 10B may be formed by pouring a raw material around the first simulated animal organ using a mold not illustrated, so as to produce an integrated simulated animal organ 10. In this case, the simulated animal organ 10 may be produced with a foreign matter 10C formed to simulate a tumor or the like embedded inside, for example, as illustrated with a dotted line. In this manner, a surgical technique to take out the tumor or the like can be trained, or echography for detecting a foreign matter can be trained.

As illustrated in FIG. 4(D), by employing the production method of the first embodiment or another production method, a simulated blood vessel K in a string or tubular shape simulating a blood vessel (that can be a foreign matter) can be formed, and the simulated blood vessel K may be embedded in the simulated animal organ 10. In this manner, a surgical technique to incise the simulated animal organ 10 with an electric knife or the like to take out the blood vessel K from inside or to anastomose (connect) the blood vessel K can be trained.

Next, a second embodiment of the present invention will be described. It is noted that a part of the description common to or similar to the first embodiment will be omitted and a difference will be mainly described.

Figure 5:
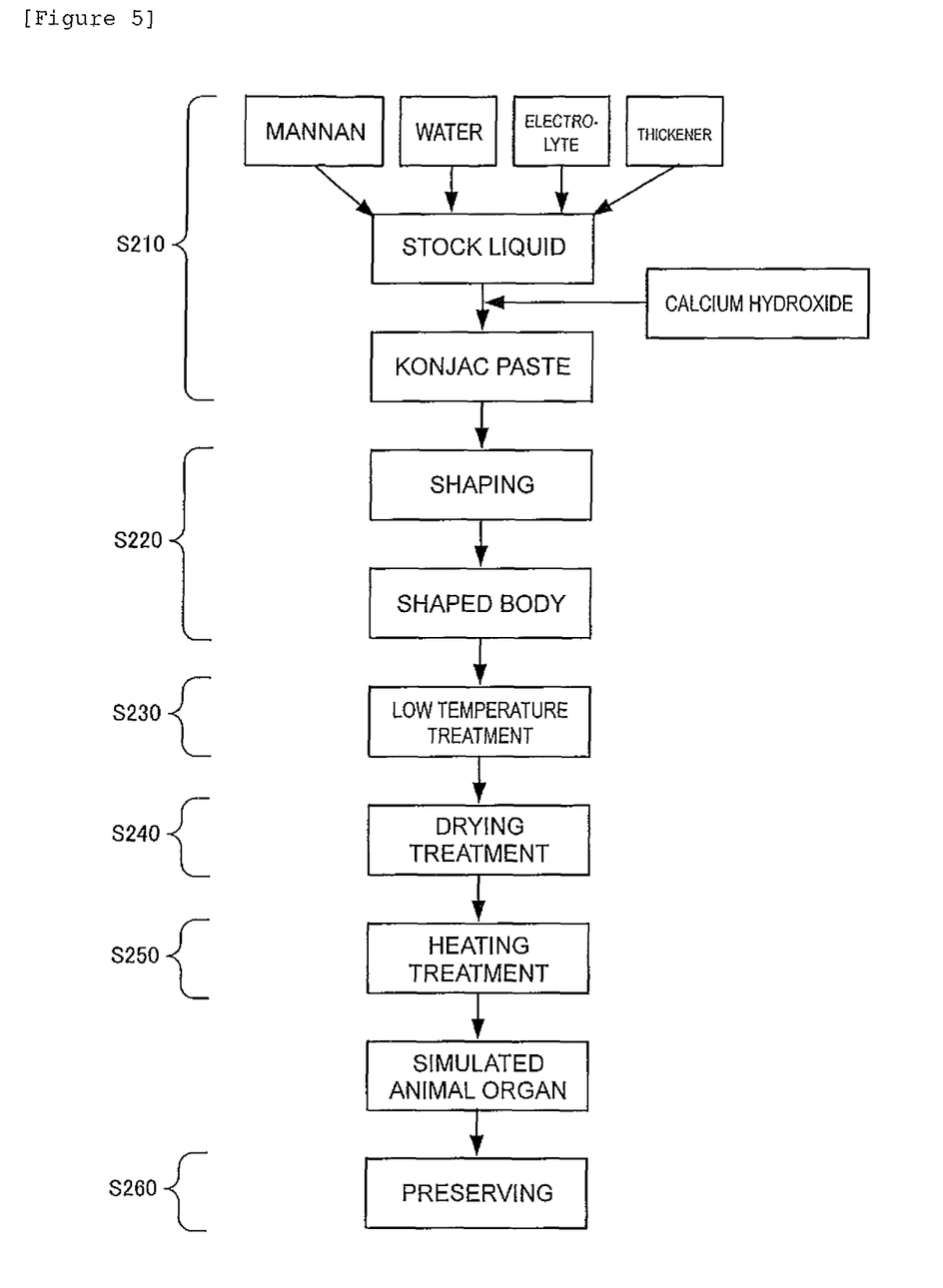
FIG. 5 is a flowchart illustrating a production process for a simulated animal organ according to a second embodiment of the present invention.

FIG. 5 illustrates a production process for a simulated animal organ according to the second embodiment of the present invention.

<Kneading/Gelatinizing Step (S210)>

In a kneading/gelatinizing step S210, a raw material containing mannan as a main component is mixed with water, an electrolyte and a thickener and the resultant mixture is kneaded to obtain a stock liquid. Specifically, an electrolyte is mixed with water to obtain an aqueous electrolyte solution, and mannan, the aqueous electrolyte solution and a thickener are kneaded to obtain a stock liquid.

An electrolyte refers to a substance that becomes conductive when dissolved in water, and specifically, the electrolyte becomes a charged ion in water to exhibit a conductive property. Examples of the ion of the electrolyte include a sodium ion, a potassium ion, a calcium ion, a magnesium ion, a chloride ion, a phosphoric acid ion and a hydrogen carbonate ion, but it may be another ionic substance.

In the second embodiment, sodium chloride (salt) is used as the electrolyte. In other words, a saline solution is used as the aqueous electrolyte solution.

The thickener refers to a substance used for increasing the viscosity of or thickening the stock liquid, and can increase the stability of the konjac paste to prevent separation thereof. The thickener is divided into an animal thickener (such as gelatin) and a plant thickener (such as a polysaccharide or a chemical derivative of cellulose). Specifically, representative examples of the thickener include pectin, guar gum, xanthan gum, tamarind gum, carrageenan, propylene glycol, carboxymethyl cellulose, starch, crystalline cellulose, trehalose and dextrin, and one of or a mixture of these can be used. For example, a mixture of dextrin, starch and a thickening polysaccharide can be used.

A mixing ratio among the raw material, water, the electrolyte (salt) and the thickener is, for example, 8:340:2:3, and the stock liquid is prepared by gradually adding the raw material and the thickener to the saline solution with stirring, and the resultant product is allowed to stand for a while. Incidentally, a content ratio of the electrolyte (sodium chloride) in the prepared stock liquid is preferably 1.0% by weight or less, and more preferably 0.7% by weight or less and 0.01% by weight or more. Besides, a content ratio of the thickener in the stock liquid is preferably 5.0% by weight or less, and more preferably 3.0% by weight or less and 0.5% by weight or more.

Thereafter, calcium hydroxide or the like is added thereto, and the resulting stock liquid is further stirred for gelatinization. As a result, a so-called konjac paste can be obtained.

<Shaping Step (S220)>

In a shaping step S220, the konjac paste is shaped into the same shape as an animal organ of interest. As a result, a shaped body made of the konjac paste shaped into a desired shape can be obtained. Incidentally, for use in training, the konjac paste can be shaped into any of arbitrary shapes including a square, a rectangle, a circle and a sphere.

<Low Temperature Step (S230)>

In a low temperature step S230, the shaped body is kept in a low temperature environment lower than normal temperatures for a prescribed period of time. When the shaped body is frozen, the binding state in the konjac paste is enhanced and fibrillization proceeds, and a situation where it is crushed or torn off when pinched with forceps can be appropriately reduced, and thus, an inside state extremely close to that of an actual organ can be attained.

In the low temperature step S230, the shaped body is specifically kept at 0° C. or lower to freeze at least a part thereof. If the thickener is mixedly used, the shaped body is kept preferably, for example, at −5° C. or lower and −15° C. or higher. Thus, appropriate fibrillization proceeds, and hence, suitable strength can be attained while inhibiting the amount of water leaking in during incision with an electric knife. The shaped body is kept, for example, at about −8° C. for 10 hours. Incidentally, if it is frozen at a temperature lower than −15° C. (for example, at −20° C.), the fibrillization may excessively proceed in some cases, and in such a case, the water holding capacity may be lowered to reversely increase the amount of water leaking in during incision with an electric knife in some cases.

<Drying Step (S240)>

In a drying step S240, a water component of the shaped body is evaporated for drying. In this drying step S240, merely a portion in the vicinity of the outer surface of the shaped body may be dried, and thus, the tensile strength of the outer surface alone can be increased. Incidentally, if there is no need to form an epidermis, this drying step S240 may be omitted.

<Heating Step (S250)>

In a heating step S250, the shaped body is heated to increase its elasticity. Incidentally, since the thickener is mixedly used in this second embodiment, the elasticity and the strength are compensated by the thickener, and hence this heating step S250 may be omitted.

<Preserving Step (S260)>

In a preserving step S260, the simulated animal organ 10 completed through the above-described plural steps is immersed in a strong alkaline liquid and packaged.

The simulated animal organ according to the second embodiment produced through the above-described steps is highly reproducible for an actual organ such as a viscera, and has the following advantages in addition to the advantages of the first embodiment.

(1) Conductivity

Since the present simulated animal organ contains the electrolyte, the conductivity can be further improved. Accordingly, in a surgical technique using an electric knife including a return electrode, the simulated animal organ can be stably incised. In particular, the content ratio of the electrolyte (sodium chloride) in the stock liquid is preferably 1.0% by weight or less, and more preferably 0.7% by weight or less and 0.01% by weight or more, and hence, sharpness close to that for an actual animal organ can be attained. Incidentally, if the content ratio of the electrolyte is too high, an electric knife device may give an emergency alarm (alarm) in some cases.

(2) Drip Inhibition

Since the present simulated animal organ contains the thickener, the amount of water leaking simultaneously with incision with an electric knife can be suppressed. This also leads to the sharpness close to that for an actual animal organ. If the amount of the thickener is too small (or the thickener is not contained), the amount of water leaking in incision is increased, and the resultant water component may cause the electric knife device to give an emergency alarm (alarm) in some cases. Incidentally, the simulated animal organ of the present second embodiment is produced also through the low temperature step S230, and hence, appropriate strength and drip inhibition can be both attained.

The simulated animal organ contains both the electrolyte and the thickener in the second embodiment described above, to which the present invention is not limited. For example, for purpose of increasing the stability in incision with an electric knife, the electrolyte alone may be contained to increase the conductivity. Similarly, for purpose of inhibiting water drip in incision with an electric knife, the thickener alone may be contained.

A case of producing a viscera of an animal is mainly described as an example in the above-described embodiments, but the present invention is not limited to this case and another organ such as skin, an arm, a mouth, a nose, an ear, a leg or a finger may be produced.

It is noted that the present invention is not limited to the above-described embodiments, but it goes without saying that various modifications and changes can be made without departing from the scope of the present invention.

REFERENCE SIGNS LIST 10 simulated animal organ
40 electric knife
50 forceps
70A, 70B, 70C stock liquid

The invention claimed is:

1. A method for producing a simulated animal organ and training for surgery on the simulated animal organ comprising:
a shaping step of mixing a raw material containing mannan as a main component, water, and an electrolyte to the extent that the raw material has enough conductivity for a medical electric knife, for gelatinization and shaping a gelatinized substance containing the mannan to obtain a shaped body;
a low temperature step of keeping the shaped body at −5° C. or lower while freezing the water inside the shaped body, wherein the shaped body is frozen in the low temperature step until the mannan is changed into a mesh-like or fibrous form; and
a cutting step of cutting the simulated animal organ with the medical electric knife.

2. The method for producing a simulated animal organ and training for surgery on the simulated animal organ according to claim 1,
wherein the electrolyte is mixed at 1.0% by weight or less.

3. The method for producing a simulated animal organ and training for surgery on the simulated animal organ according to claim 1,
wherein the electrolyte is sodium chloride.

4. The method for producing a simulated animal organ and training for surgery on the simulated animal organ according to claim 1,
wherein a thickener is mixed in the shaping step.

5. The method for producing a simulated animal organ and training for surgery on the simulated animal organ according to claim 1, further comprising:
a heating step of heating the shaped body and the water inside the shaped body until sterilized after the low temperature step.

6. The method for producing a simulated animal organ and training for surgery on the simulated animal organ according to claim 1,
wherein a foreign matter is contained inside the shaped body in the shaping step.

7. The method for producing a simulated animal organ and training for surgery on the simulated animal organ according to claim 1, comprising:
a second shaping step of filling or stacking, inside or around the shaped body, a second material obtained by gelatinizing a mixture of a raw material containing mannan as a main component and water.

8. A simulated animal organ produced by the production method according to claim 1.

9. A method for producing a simulated animal organ and using the produced simulated animal organ comprising:
a shaping step of mixing a raw material containing mannan as a main component and water for gelatinization and shaping a gelatinized substance containing the mannan to obtain a shaped body;
a low temperature step of keeping the shaped body at −5° C. or lower while freezing the water inside the shaped body, wherein the shaped body is frozen until the mannan is changed into a mesh-like or fibrous form in the low temperature step,
wherein an electrolyte is mixed with the water so that the electrolyte remains in the simulated animal organ in the shaping step such that the simulated animal organ can be stably cut by an electric knife; and
a cutting step of cutting the simulated animal organ with the electric knife.

10. The method for producing a simulated animal organ and training for surgery on the simulated animal organ according to claim 1,
wherein the shaped body is kept at −15° C. or higher in the low temperature step.

11. The method for producing a simulated animal organ and training for surgery on the simulated animal organ according to claim 1, wherein the shaped body is kept at −15° C. or lower.

12. The method for producing a simulated animal organ and using the produced simulated animal organ according to claim 9,
wherein the shaped body is kept at −15° C. or higher in the low temperature step.

13. The method for producing a simulated animal organ and using the produced simulated animal organ according to claim 9, further comprising:
a heating step of heating the shaped body and the water inside the shaped body until sterilized after the low temperature step.

14. The method for producing a simulated animal organ and using the produced simulated animal organ according to claim 9,
  wherein the shaped body is kept at −15° C. or lower.

* * * * *